United States Patent [19]

Berthold

[11] Patent Number: 5,042,251
[45] Date of Patent: Aug. 27, 1991

[54] SECONDARY CONTROLLED HYDROSTATIC DRIVING GEAR HAVING AN OPEN CIRCUIT

[75] Inventor: Heinz Berthold, Horb, Fed. Rep. of Germany

[73] Assignee: BrueninghausHydraulik GmbH, Fed. Rep. of Germany

[21] Appl. No.: 235,214

[22] Filed: Aug. 23, 1988

[30] Foreign Application Priority Data

Sep. 3, 1987 [DE] Fed. Rep. of Germany ....... 3729495

[51] Int. Cl.$^5$ ............................................. F16D 31/02
[52] U.S. Cl. ...................................... 60/448; 60/452; 60/489; 60/490
[58] Field of Search ................. 60/490, 452, 487, 446, 60/448; 417/222

[56] References Cited

U.S. PATENT DOCUMENTS

| 2,232,428 | 3/1937 | Benedek | 60/489 |
|---|---|---|---|
| 4,351,152 | 9/1982 | Reynolds et al. | 60/395 |
| 4,420,935 | 12/1983 | Kobald | 60/452 |
| 4,468,173 | 8/1984 | Dantlgraber | 417/222 |
| 4,478,041 | 10/1984 | Pollman | 60/450 X |
| 4,518,321 | 5/1985 | Schniederjan | 60/452 |
| 4,665,699 | 5/1987 | Krusche | 60/452 |
| 4,679,396 | 7/1987 | Heggie | 60/490 |
| 4,688,380 | 8/1987 | Reinhardt et al. | 60/446 |
| 4,689,956 | 9/1987 | Hein | 60/445 |
| 4,777,797 | 10/1988 | Mucheyer | 60/452 |
| 4,845,950 | 7/1989 | Metzner | 60/448 |
| 4,949,541 | 8/1990 | de Vietro | 60/452 X |

FOREIGN PATENT DOCUMENTS

| B359795 | 11/1980 | Austria . |
| A20217367 | 4/1987 | European Pat. Off. . |
| A13404190 | 8/1985 | Fed. Rep. of Germany . |
| 3623066 | 1/1988 | Fed. Rep. of Germany . |

OTHER PUBLICATIONS

"Hydrostatische Getriebe", Jean Thoma, Karl-Hanser-Verlag, Munich, 1964, pp. 68 to 70.
"olhydraulik und pneumatik", vol. 1, 1963, pp. 74, 75.
o + p "olhydraulik und pneumatik" 29 (1985), Nr. 7.
o + p "olhydraulik und pneumatik" 30 (1986), Nr. 12.

Primary Examiner—Edward K. Look
Assistant Examiner—John E. Ryznic
Attorney, Agent, or Firm—Scully, Scott, Murphy & Presser

[57] ABSTRACT

A hydrostatic driving gear is described comprising a primary unit rotationally driven by a driving engine and a secondary unit rotationally driving an actuator. Each unit comprises a variable displacement hydraulic engine, in particular an axial piston engine. They cooperate in an open circuit. The primary unit and secondary unit each have a displacement adjusting device and can be continuously adjusted in respect of their direction of displacement through a zero displacement center position in two directions of displacement. The displacement adjusting device of the primary unit has associated with it a pressure flow controller which holds the working pressure at a constant presettable value. The displacement adjusting device of the secondary unit has associated with it a speed of rotation detecting device, having a position sensor to detect the flow setting. The secondary unit also has associated with it a speed detecting device and an electronic controller is provided which detects the displacement setting of the secondary unit and its actual speed of rotation and compares it with a predetermined desired actual speed of rotation and adjusts the controller correspondingly. A secondary controlled hydrostatic driving gear in an open circuit is provided which makes four-quadrant operation possible.

10 Claims, 2 Drawing Sheets

SECONDARY CONTROLLED HYDROSTATIC DRIVING GEAR HAVING AN OPEN CIRCUIT

TECHNICAL FIELD OF THE INVENTION

The invention relates to a hydrostatic driving gear comprising a pump (primary unit) rotationally driven by a driving engine and a motor (secondary unit) rotationally driving an actuator. The pump and motor each comprise a variable displacement hydraulic engine, in particular an axial piston engine, which cooperate in an open circuit in which the pump sucks working medium from a tank with which the motor is connected by means of a working pressure line and the motor discharges the working medium to the tank. The pump and motor are each continuously adjustable in respect of direction of displacement by a respective displacement adjusting device through a zero-displacement centre position in two directions of displacement.

BACKGROUND OF THE INVENTION AND PRIOR ART

Such hydrostatic open circuit driving gears with so-called primary adjustment and so-called secondary adjustment are known. If the primary unit (pump) is controlled to produce a constant working pressure it is important for the control of the speed of the secondary part (motor) that the latter, as a result of the constant working pressure delivered by the primary unit, always delivers at its output shaft a torque for the actuator proportional to its swept volume setting as long as the loss factors are negligible (book by Jean Thoma, "Hydrostatische Getriebe", Karl-Hanser-Verlag, Munich 1964, p. 68 to 70). If the direction of the flow of energy is to change in this kind of driving gear having an open circuit, i.e. if the motor (secondary unit) is to operate as the pump and the pump (primary unit) as the motor, the direction of rotation of the pump and motor has to be changed and both the primary and the secondary unit must be tilted through the zero-displacement centre position to change their displacement setting. A change in the direction of the flow of energy, in particular in braking operation, while maintaining the input and output direction of rotation is not possible in a hydrostatic driving gear of this kind without specific control organs (Ölhydraulik und Pneumatik, Publication Series, Volume 1, Grundschaltpläne hydraulische Anlagen (Basic circuits, hydraulic plants), 1963, pp. 74, 75). With the change in direction of the flow of energy by reversing the direction of flow in the working pressure line, made possible by tilting the pump through the zero-position to negative displacement (swept volume), there is still no teaching of how to obtain a braking operation, i.e. how an actuator can be retarded by such a driving gear without destroying the braking energy by exhausting and heating the returned working medium.

OBJECT OF THE INVENTION

The object of the invention is, in a hydrostatic driving gear of the kind mentioned in the introduction and described in the second publication mentioned, to design the means of controlling the primary unit and the secondary unit so that it is possible to switch over the flow of energy very quickly and so that in the braking operation the braking power at the pump (primary unit), which then operates as a motor, is not lost.

BRIEF DESCRIPTION OF THE INVENTION

In order to achieve this object the hydrostatic driving gear of the kind mentioned in the introduction is characterised in that the displacement adjusting device of the primary unit is associated with a known pressure flow controller which, by adjusting the displacement of the primary unit, keeps the pressure in the working pressure line constant at a value that can be set, in that the displacement adjusting device of the secondary unit is associated with a known speed of rotation flow controller which has a position sensor to detect the displacement setting, in that the secondary unit is associated with a speed detecting device, and that an electronic control system is provided with which the position sensor and the speed detecting device are connected and which picks up the actual speed of rotation and the actual displacement setting and delivers a control signal, which is formed by the electronic control system corresponding to a desired speed of rotation that can be set, to the displacement adjusting device of the secondary unit.

The displacement adjusting device of the pump (primary unit) always keeps the pump at a constant working pressure independent of the direction of energy flow. The primary unit can be tilted through the zero position to negative displacement (swept volume) and can thereby, while maintaining the direction of rotation, run as a motor and deliver energy back to the driving engine of the pump and thus retard the actuator at the motor (secondary unit). The electronic control continuously compares the given desired speed of rotation with the actual speed of rotation of the motor (secondary unit) and thereby determines the torque delivered by the secondary unit to the actuator or that received therefrom. Correspondingly, by varying the displacement setting at the secondary unit, the swept volume or—in the case when torque is delivered by the actuator (braking operation)—displacement at the secondary unit is set so as to obtain the desired speed of rotation. From the last-mentioned state—torque from the actuator and secondary unit set beyond the zero-displacement centre position to displacement—an increase in pressure results in the working pressure line above the constant value set at the pressure flow controller of the primary unit, and this causes, by means of the pressure flow controller in the primary unit, the pump (primary unit) to tilt back to smaller displacement through the zero-displacement centre position to negative displacement corresponding to a swept volume, so that the primary unit works as a motor. The driving gear is thereby exclusively indirectly controlled. The primary unit is exclusively controlled depending on the pressure—deviations from the preset working pressure occurring in the working pressure line—even when the energy flow is reversed, i.e. in braking operation.

Since in the driving gear according to the invention the pump and motor can exchange their functions, so that one would have to speak of a motor and a pump, it is more appropriate, based on the particular kind of control, to speak of a primary unit and a secondary unit. Correspondingly, it is not necessary to differentiate according to the operating state between displacement and swept volume of the units and only displacement, possibly also negative displacement, need be spoken of. Calling the controller associated with the displacement adjusting device of the primary unit a pressure flow controller expresses the idea that the displacement of the primary unit is controlled by a (pre-determinable) pressure. Calling the controller associated with the displacement adjusting device of the secondary unit a speed flow controller expresses the idea that the displacement of the secondary unit is controlled depending on a (predeterminable) speed of rotation, which means that the secondary unit is controlled depending on the torque given off by it to the actuator or that coming from the actuator.

The driving gear according to the invention makes it possible, with constant direction of rotation at the primary unit, for the secondary unit to operate in both directions of rotation and in addition for it to change its function into the pump operation in which the braking torque received by it is transferred to the primary unit which delivers (returns) this torque in an energy-saving manner to its driving engine. The driving gear according to the invention can also be termed a rotary driving gear and there is so-called four-quadrant operation for the secondary side, which will be described below in detail in connection with the drawings. What is special about this four-quadrant operation is that it can be obtained with a driving gear according to the invention in open circuit while maintaining the one working pressure line as a high pressure line. Apart from the reversal of the energy flow, the driving gear according to the invention has the further decisive advantage that torque reversal and speed of rotation changes can become effective very quickly and without delay, since the preset working pressure in the working pressure line is always maintained constant except for the necessary control fluctuations, and the speed of rotation change at the secondary unit and primary unit, and thus the torque reversal, only depends on the rapidity of the change in the displacement setting at the secondary unit and the primary unit. This displacement adjustment can take place extremely quickly, in the order of magnitude of a few milliseconds, with modern hydraulic machines.

In an advantageous arrangement of the invention the displacement adjusting device of the primary unit, like that of the secondary unit, has an adjustment piston which on the one side can be acted on by control medium towards smaller displacement settings up to maximum negative displacement and on the other side is preloaded by a spring from the position of maximum negative displacement through the zero-displacement centre position of the associated displacement adjustment device towards maximum positive displacement.

It is also possible to associate with the displacement adjusting devices of the primary unit and the secondary unit respective adjusting pistons which can be acted on by control medium on their one and/or other side and which are centred by springs between their maximum positive and maximum negative displacement positions. As a result of this the throughput setting can be simplified and this arrangement also enables the adjustment devices to be set by only one adjusting piston.

In addition, the pressure flow controller of the primary unit has a first pressure control valve which is acted on the one side by the working pressure in the working pressure line and on the other side by an adjustable spring and supplies working medium as control medium to the adjusting piston of the displacement adjusting device of the primary unit or returns it to the tank. The speed of rotation flow controller of the secondary unit has a control valve which can be adjusted by the control signal from the electronic control and supplies working medium as control medium to the adjusting piston of the secondary unit or returns it to the tank.

This arrangement of the controller has the following decisive advantages: neither a feed pump nor a control pressure pump is necessary for the control medium since the control medium for both controllers is branched from the working pressure medium. Primary and secondary pressure limiting valves are not necessary so that the construction costs are kept small. The primary unit and secondary unit have, including their adjusting device, basically the same construction. Identical components can be used. The primary side and secondary side of the driving gear differ only in the controls associated with the adjusting devices, the pressure flow controller in the primary unit and the speed of rotation flow controller in the secondary unit.

In an advantageous arrangement of the invention, arranged in the working pressure line there is a check valve closing in the direction of flow of the working medium from the primary unit to the secondary unit which is formed as a pilot-operated check valve and can be held in its open position by a signal delivered by the electronic controller. The pilot-operated check valve can suitably be switched hydraulically by a pilot valve which, when there is no signal from the electronic control, switches the check valve to its closed operating position. This pilot-operated check valve in the working pressure line first has a safety function and secondly enables the driving gear according to the invention to be operated in standby mode. For the latter purpose, the pressure flow controller of the primary unit has a second pressure control valve which is connected functionally in parallel to the first pressure control valve and which is acted on on the one side by the working pressure in the working pressure line between the primary unit and the check valve and on the other side is acted on by an adjustable spring and by the pressure in the working pressure line between the check valve and the secondary unit and supplies working medium as control medium to the adjusting piston of the displacement adjusting device of the primary unit or returns it to the tank. The manner of operation of the second pressure control valve at the pressure flow controller of the primary unit for carrying out a standby operation will be described below in more detail with reference to the exemplary embodiment.

The safety function of the pilot-operated check valve is based on the fact that should one of the signals or signal values for the desired speed of rotation, actual speed of rotation or displacement adjustment of the secondary unit supplied to or emitted by the electronic control not appear, or should the signal to hold the check valve open also not appear, the check valve closes. If at this moment in time the secondary unit is operating to drive its actuator, thus taking power from the primary unit by way of the working pressure medium, the flow to the secondary unit is interrupted by the check valve and as a result the secondary unit is uncoupled from the primary unit. The primary unit tilts towards the displacement setting zero whilst maintaining the preset constant working pressure of the working pressure medium in the working pressure line in front of the check valve. If at said moment in time the secondary unit is in the state of receiving torque (braking operation), the check valve lets the working pressure medium pass and the braking operation occurs, supported at the primary unit as described, until the actuator at the secondary unit has been retarded. It must be pointed out that the pilot-operated check valve in the working pressure line does not have any throttling effect during normal operation of the driving gear and has no influence on the speed control of the secondary unit.

In further advantageous arrangements of the invention two or more secondary units having a speed flow controller, a position sensor, a speed of rotation detecting device and electronic control means are associated with the primary unit with its pressure flow controller, each by way of a pilot-operated check valve in the working pressure line as aforesaid. The design of the primary control and secondary control means according to the invention surprisingly enables a plurality of secondary units to be connected to a primary unit while maintaining all the above-mentioned functions and advantages according to the invention for each secondary unit. In addition the connection of each further secondary unit by way of a pilot-operated check valve is only necessary if the above-mentioned safety function and the standby function are to be maintained. However, when connecting a plurality of secondary units to one primary unit this appears to be useful.

In the arrangement according to the invention having a plurality of secondary units the primary unit—as long as it can maintain the adjustable constant working pressure value—represents a source of energy for any number of secondary units which according to the operating state, in particular in braking operation, can also supply power back to the primary unit, which has this power available for the actuators connected to the other secondary units without having to take this power from its driving engine.

In a further arrangement of the invention it is also possible for the primary unit with a pressure flow controller to be associated by way of a said pilot-operated check valve in the working pressure line with at least one secondary unit with a speed of rotation flow controller, a position sensor, a speed of rotation detecting device and electronic control means and for a further actuator, in particular an adjustment cylinder, which can be fed by a transmission control valve to be connected to the working pressure line between the primary unit and the check valve. Such an adjustment cylinder forming an actuator can also be supported at the primary unit with power recovery in the case of backward movement produced by its load.

The driving gear according to the invention is particularly suitable for use in a test stand for internal combustion engines in which in order to test the internal combustion engines sudden load and speed of rotation changes must be simulated. A test program can serve this purpose by feeding in corresponding desired speeds of rotation to the electronic controller.

BRIEF DESCRIPTION OF THE DRAWINGS

An exemplary arrangement of the invention will now be described in more detail with reference to the drawings, in which.

In the diagrams and in the circuit diagram as well as in the following description the symbols have the following meanings:

$n_{l,r}$: speeds of rotation at the drive and output shafts of the primary and secondary unit, $n_{soll}$: desired speed of rotation of the secondary unit which can be set at the electronic controller, $n_{ist}$: actual speed of rotation of the secondary unit, $\alpha$: displacement setting (tilt angle) of the units, $\pm \alpha$: positive or negative tilt angles which can, according to the direction of rotation of the unit, correspond to a positive flow, supplied by the unit, or a negative flow (swept capacity) received by the unit, $\pm Q$: positive or negative displacement, $\pm M\alpha$: torque supplied ($-$) and received ($+$) by the primary and secondary unit, P: working pressure in the working pressure line of the driving gear.

DETAILED DESCRIPTION OF PREFERRED EMBODIMENTS OF THE INVENTION

Figure 1:
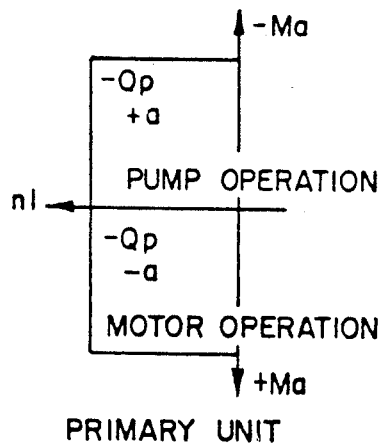
FIGS. 1 and 2 show diagrams for the primary unit and secondary unit in order to explain the four-quadrant operation.
Figure 2:
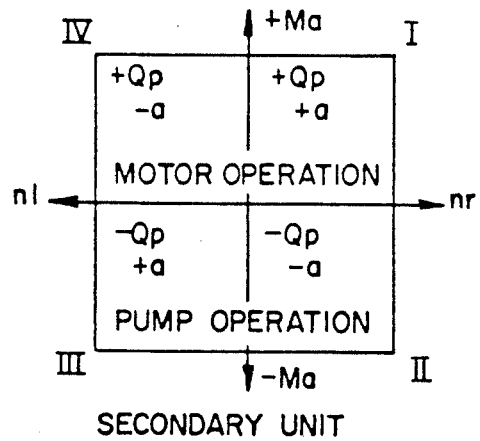

In the diagrams shown in FIGS. 1 and 2 the speed of rotation of the primary or secondary unit is shown as abscissae and the torque as ordinates. At the maximum speed of rotation and corresponding maximum torque predetermined in terms of construction and performance by the driving engine of the primary unit, the primary and secondary units can be controlled according to speed of rotation and torque within the rectangular areas shown as quadrants I to IV in the diagrams shown in FIGS. 1 and 2.

The four-quadrant operation of the secondary unit is represented as follows:

Quadrant I, i.e. motor operation of the secondary unit with delivered torque being $+M\alpha-$ direction of rotation right ($n_r$)

working medium flows from the primary unit to the secondary unit tilt angle $+\alpha$ at the secondary unit (here means swept volume, since primary unit is in opposite direction of rotation to the secondary unit)

primary unit in pump operation, tilt angle $+\alpha$, direction of rotation of the primary unit left ($n_l$)

Quadrant II, i.e. pump operation of the secondary unit direction of rotation right ($n_r$)

working medium flows from secondary unit to the primary unit (braking operation)

tilt angle $-\alpha$ at the secondary unit (here corresponds to displacement, since speeds of rotation between primary unit and secondary unit are opposite)

primary unit in motor operation, tilt angle $-\alpha$, direction of rotation of the primary unit left ($n_l$)

Quadrant III, i.e. pump operation of the secondary unit direction of rotation left ($n_l$)

working medium flows from the secondary unit to the primary unit (braking operation)

tilt angle $+\alpha$ at the secondary unit (here means actual positive displacement, since same direction of rotation for the primary and secondary unit)

primary unit in motor operation, tilt angle $-\alpha$ (negative displacement=swept volume), direction of rotation of the primary unit left ($n_l$)

Quadrant IV, i.e. motor operation of the secondary unit direction of rotation left ($n_l$)

working medium flows from the primary unit to the secondary unit tilt angle $-\alpha$ at the secondary unit (swept volume) primary unit in the pump operation, tilt angle $+\alpha$ (positive displacement) of the primary unit, direction of rotation of the primary unit left ($n_l$).

These functional positions described in the four-quadrant operation also show that primary unit and secondary unit have basically the same structural form corresponding to their equivalent functions.

Figure 3:
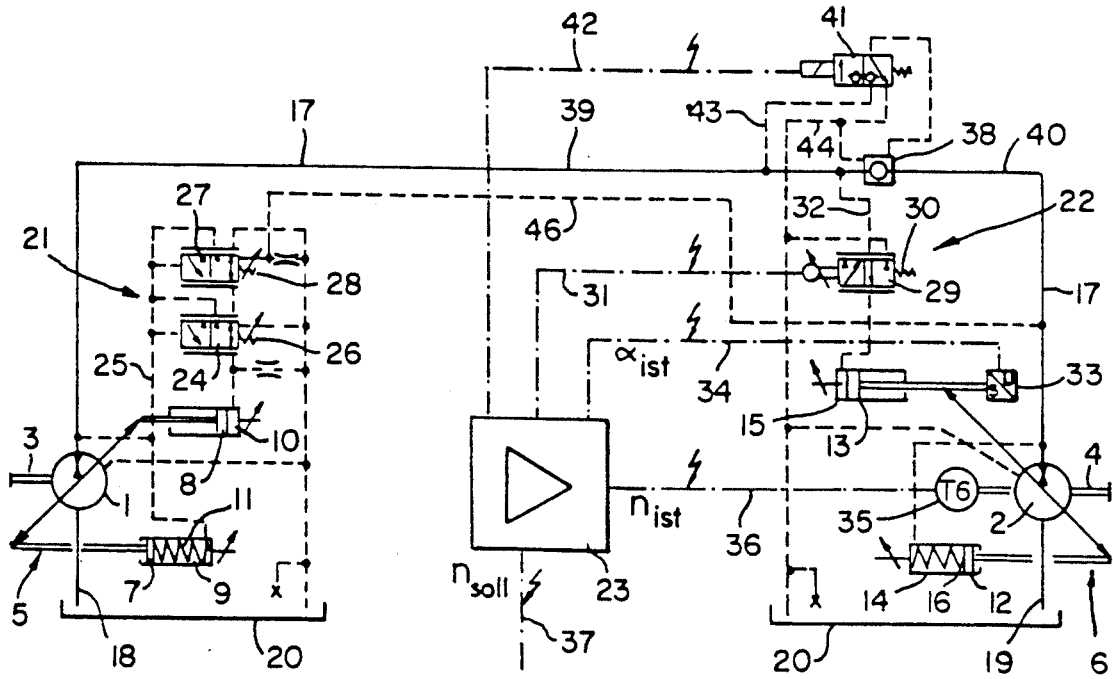
FIG. 3 shows a circuit diagram of the hydrostatic driving gear with its components.

In FIG. 3, the circuit diagram of the hydrostatic driving gear, the primary unit is indicated by 1 and the secondary unit by 2. Connected to the shaft 3 of the primary unit 1 is a driving engine (not shown); connected to the shaft 4 of the secondary unit 2 is an actuator (not shown) to be rotationally driven. The adjusting device of the primary unit 1 is indicated by 5 and the adjusting device of the secondary unit 2 by 6. The adjusting device 5 of the primary unit 1 comprises an adjusting piston which can be acted on on both sides and is divided into two pistons 7 and 8 which work in cylinder spaces 9, 10. In the cylinder space 9 there is a spring 11 which acts on the piston 7 and prestresses the primary unit 1 towards full displacement, tilt angle $+\alpha$. In the cylinder space 10 an adjusting pressure acts, as described below, on the piston area of the piston 8, which is larger than the effective piston area of the piston 7. The adjusting device 6 of the secondary unit 2 comprises an adjusting piston which can be acted on on both sides and is divided into two pistons 12 and 13 which work in the cylinder spaces 14, 15. In the cylinder space 14 there is a spring 16 which acts on the piston 12 and prestresses the secondary unit 2 towards full displacement, tilt angle $+\alpha$. In the cylinder space 15 an adjusting pressure acts, as described below, on the piston area of the piston 13, which is larger than the effective piston area of the piston 12.

The primary unit 1 and the secondary unit 2 are connected on the one side by a working pressure line 17 and on the other side to the pressureless tank 20 by lines 18, 19. The adjusting device 5 of the primary unit 1 is associated with a pressure flow controller 21. Associated with the adjusting device 6 of the secondary unit 2 is a speed of rotation flow controller 22 and an electronic controller 23.

The pressure flow controller 21 comprises a first pressure control valve 24 whose control spool is acted on on the one side by the pressure of a control medium branched from the working pressure line 17 and applied in the control line 25 and is loaded on the other side by an adjustable spring 26. The first pressure control valve 24, according to the control setting, directs control medium to the cylinder space 10 from the line 25 to adjust the primary unit or connects the cylinder space 10 with the outlet. Located parallel to the first pressure control valve 24 is a second pressure control valve 27 whose control spool is also acted on on the one side by the pressure of the control medium of the control line 25 and on the other side is loaded by an adjustable spring 28. The second pressure control valve 27 can also deliver control medium to the cylinder space 10 or conduct it away from the cylinder space 10.

The speed of rotation flow controller 22 of the secondary unit 2 comprises a control valve 29 whose control spool is loaded on the one side by a spring 30 and on the other side by an electro-magnetic control member which is controlled by the control signal in the electric line 31 coming from the electronic controller 23. The control valve 29 connects the control line 32 branching from the working pressure line 17 to the cylinder space 15 of the adjusting device 6 and feeds the cylinder space 15 with the adjusting medium branching from the working medium by way of the line 32 or conducts the adjusting medium from the cylinder space 15 to the tank 20. The speed of rotation flow controller 22 of the secondary unit 2 further includes a position sensor 33 which, for example, is formed as a potentiometer and supplies a signal via the electric line 34 to the electronic controller 23 which, corresponding to the position of the piston 13 and thus the actual tilt position $\alpha_{ist}$, corresponds to a displacement setting of the secondary unit 2. Also arranged on the shaft 4 of the secondary unit 2 is a speed of rotation detecting device in the form of a tacho-generator 35 which supplies a signal via an electric line 36 to the electronic controller 23 which corresponds to the speed of rotation $n_{ist}$ of the secondary unit 2. A signal is supplied to the electronic controller 23 via the electric line 37 which is adjustable and which corresponds to the required desired speed of rotation $n_{soll}$ of the secondary unit.

In an advantageous arrangement a so-called pilot-operated check valve 38 is arranged in the working pressure line 17 which in its blocked operating position blocks in the direction of flow from the primary unit 1 to the secondary unit, i.e. it interrupts the flow in the line 17. The working pressure line 17 is divided into two parts 39 and 40 by the check valve 38. Associated with the pilot-operated check valve is a pilot valve 41 which can be controlled electro-magnetically by a signal in the electric line 42 from the electronic controller 23. In one position (open) this pilot valve 41 supplies in a known manner adjusting medium to a control surface of the closure member of the check valve 38 so that the check valve 38 is held in its open, relaxed position. The control medium is branched from the working pressure line 17 by a line 43. In the other position of the pilot valve 41 the control surface of the closure member of the check valve 38 is connected by way of the line 44 to the tank (position of the pilot valve 41 shown. The check valve 38 is not relaxed but is in its closed position). The part 40 of the working pressure line 17 between the check valve 38 and the secondary unit 2 is connected via a control line 46 to the second pressure control valve 27 of the pressure flow controller 21 of the primary unit 1 so that the control spool of the pressure control valve 27 can be acted on parallel to the spring 28 by an adjusting pressure corresponding to the pressure in the working pressure line 40.

The manner of operation of the hydrostatic driving gear according to the invention will now be described with reference to the circuit diagram described above: In the inoperative state when the driving engine of the primary unit 1 is not running both the primary unit 1 and the secondary unit 2 are set by the springs 9 and 16 respectively of their adjusting devices to maximum displacement, tilt angle $+\alpha$. The pilot-operated check valve 38 is therefore closed by the corresponding setting of the pilot valve 41 as shown in the closed function position.

If the driving engine of the primary unit 1 is set in operation by applying torque to its shaft 3 a working pressure builds up in the working pressure line 17 against the closed check valve 38. This increased pressure is also applied in the control line 25 and acts on the control spool of the first pressure control valve 24 and of the second pressure control valve 27 against the adjustable force of the springs 26 and 28 respectively. For example, the spring 26 of the first pressure control valve 24 may be set to a pressure of 250 bar, corresponding to the desired working pressure of the driving gear, and the spring 28 of the second pressure control valve 27 may be set to a pressure of 20 bar corresponding to a standby pressure. Since the spring 28 is set to a lower pressure the second pressure control valve 27 opens when the pressure of 20 bar has been reached in the working pressure line 17 and the control line 25. Control medium is directed into the cylinder space 10 and the primary unit 1 is tilted by its adjusting device 5 from the maximum displacement setting back towards the zero-displacement centre position so far as is necessary to maintain the set standby pressure of 20 bar. The standby pressure of, for example, 20 bar is also applied in the control line 32 to the secondary unit 2. This is tilted by the standby pressure of 20 bar against the spring 16 into the zero displacement centre position corresponding to the tilt angle $\alpha=0$. The driving gear is in standby operation.

If the secondary unit 2 is to be set in operation or if an actuator driven by it is to be set in operation the pilot valve 41 is switched by the electronic controller 23 so that standby pressure of 20 bar also applied in the control line 43 relaxes the check valve 38, i.e. holds it in its open position. The secondary unit 2 does not yet drive the actuator by way of the shaft 4 since the zero displacement setting is maintained until a control signal is sent by the electronic control via the line 31 to the control valve 29, which is thus held open by the spring 30, so that the standby pressure of the line 32 acts in the cylinder space 15 of the piston 13. Relaxing and opening the check valve 38 also allows the standby pressure of 20 bar to act in the working line 40 and to act by way of the control line 46 on the spool of the second pressure control valve 27 of the pressure flow controller 21 of the primary unit 1. The second pressure control valve 27 becomes inoperative since the standby pressure of 20 bar is applied to both sides of its control spool and the pressure control valve 27 is switched by the spring 28 to the position shown, in which the cylinder space 10 is connected with the outlet. As a result of this the working pressure in the working pressure line 17 rises above the set standby pressure of 20 bar up to the working pressure of, for example, 250 bar set at the pressure control valve 24 by the spring 26. The first pressure control valve 24 goes into operation. For as long as the secondary unit 2 as indicated remains in the zero displacement position and does not receive any working medium through the working line 17 the primary unit 1 remains, as described, tilted back to small displacement so as to maintain the working pressure of 250 bar in the working line 17.

If the secondary unit 2 is to drive an actuator through its driving shaft 4 a desired speed of rotation value $n_{soll}$ is fed into the electronic controller. Since the electronic controller 23 receives via the line 36 an actual speed of rotation $n_{ist}=0$ and via the line 34 the tilt angle position $\alpha_{ist}=0$, it gives a control signal via the line 31 which corresponds to the large speed of rotation deviation $n_{soll}-n_{ist}$ and controls the control valve 29 so that the secondary unit 2 is set to a large displacement (swept volume) until the actual speed of rotation of the shaft 4 corresponds to the desired speed of rotation set. Through the corresponding control signal in the line 31 the control valve 29 is brought into a position which leads to a displacement setting of the secondary unit which corresponds (in direction of rotation and magnitude) to the set desired speed of rotation. If the actual speed of rotation of the secondary unit $n_{ist}$ should become higher than the desired speed of rotation $n_{soll}$ set at the electronic controller 23 and correspondingly the tilt angle $\alpha_{ist}$ larger than the actual speed of rotation $n_{ist}$ (at a predetermined constant working pressure of for example 250 bar there is a fixed relationship between tilt angle $\alpha$ and speed of rotation n of the secondary unit) the electronic controller 23 gives a control signal in the line 31 which brings the control valve 29 into a position in which control medium is supplied to the cylinder space 15 via the line 32 in order to tilt the secondary unit 2 back to smaller displacement (swept volume). If the actual speed of rotation $n_{ist}$ is not reached by this control measure the secondary unit 2 is tilted back further through the zero displacement centre position to negative displacement which indicates that a torque is supplied to the secondary unit 2 from the actuator via the shaft 4. Braking operation occurs: the secondary unit 2 delivers working pressure medium to the working pressure line 17. The secondary unit 2 operates as a pump. The resulting increase in pressure in the working pressure line 17 above the set pressure of, for example, 250 bar leads through the first pressure control valve 24 of the pressure displacement controller 21 of the primary unit 1 to tilting of the primary unit 1 back to smaller displacement through the zero displacement centre position to negative displacement. The primary unit 1 operates as a motor and supplies torque to its driving engine. The primary unit 1 operates as a pump while maintaining its direction of rotation.

Figure 4:
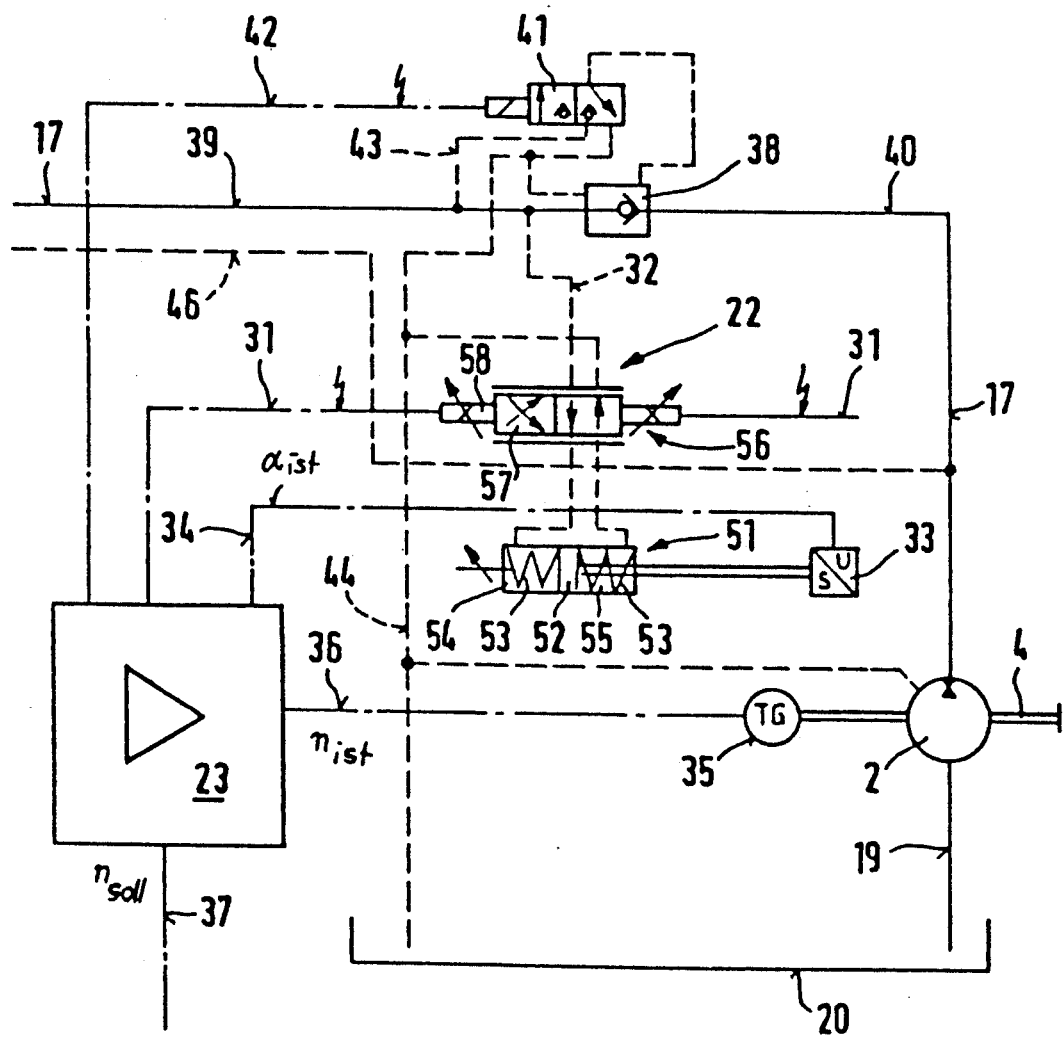
FIG. 4 shows a modification of the secondary unit as a detail.

Within the scope of the invention it is also possible to associate with each of the adjusting devices 5, 6 a respective single adjusting cylinder 51, shown in FIG. 4 as an alternative for the secondary unit, having an adjusting piston 52 which can be acted on on both sides by the control medium and is centred by the spring 53. The working spaces 54, 55 of the adjusting cylinders 51 can, by means of a two-way valve 56 in the form of a proportional valve whose spool 57 can be displaced by an adjustable electro-magnet 58 arranged at least on one side, be connected as desired to the control line 32 or the return 44. As in the afore-mentioned exemplary arrangement the electro-magnet 58 is also connected to the electronic controller 23 by an electric signal line 31 and a position sensor 33 connected to the electronic controller 23 is also associated with the displacement piston 52.

In the driving gear according to the invention the only comparison made is of the actual speed of rotation with the desired speed of rotation of the secondary unit. All the control processes resulting therefrom are made by the driving gear itself depending on the changes in pressure in the working pressure line 17 compared with the set working pressure value of, for example, 250 bar.

If for any reason a signal is not given in the lines 31, 34, 36, 37, 42 of the electronic control 23 or if the predetermined speed of rotation value $n_{soll}$ is not attainable or if the speed of rotation difference $n_{ist}-n_{soll}$ is too large (overspeed), the pilot valve 41 switches, in the absence of the signal in the line 42, the pilot-operated check valve 38 to its blocked operating position and closes it. If at this time the driving gear is in driving operation position the working pressure in the working pressure line 40 decreases and the driving gear falls into the above-mentioned standby operation. If the driving gear is at this time in the braking operation, the braking working pressure is decreased through the opening check valve 38 until the actuator of the secondary unit 2 is slowed down. Only then does the driving gear fall into the standby mode.

What is claimed is:

1. A hydrostatic driving gear comprising:
   a primary unit adapted to be driven by a driving engine, and including
   i) a primary hydraulic engine having a continuously variable displacement, and
   ii) a first adjusting means to adjust the displacement of the primary hydraulic engine, through a zero displacement center position, to two directions of flow;
   a secondary unit to drive an actuator, and including
   i) a secondary hydraulic engine having a rotatable shaft, and a continuously variable displacement, and
   ii) a second adjusting means to adjust the rotational speed of the shaft, and to adjust the displacement of the secondary hydraulic engine, through a zero displacement center position, to two directions of flow;
   a hydraulic fluid circuit connected to the primary and secondary units, and including
   i) a fluid reservoir,
   ii) means to conduct fluid to the primary hydraulic engine from the reservoir,
   iii) a working pressure line to conduct fluid to the secondary hydraulic engine from the primary hydraulic engine,
   iv) means to conduct fluid to the reservoir from the secondary hydraulic engine,
   v) a check valve disposed in the working pressure line, between the primary and secondary engines, and having an open position to conduct fluid through said working pressure line, and a closed position to prevent fluid from being conducted through the working pressure line from the primary hydraulic engine to the secondary hydraulic engine, and
   vi) valve control means connected to the check valve to move said check valve between said open and closed positions;
   a pressure flow controller connected to the first adjusting means to maintain the pressure in the working pressure line at a selected value;
   a position sensor connected to the second adjusting means to detect and to generate a first signal indicating the position of the second adjusting means;
   a speed sensor connected to the shaft of the secondary hydraulic engine to detect and to generate a second signal indicating the rotational speed of the shaft; and
   electronic control means connected to the position sensor and to the speed sensor to receive the first and second signals therefrom, and to generate a control signal and to transmit the control signal to the second adjusting means to adjust the speed of rotation of the shaft of the secondary hydraulic engine to a preselected speed, and including means to generate a valve control signal and to transmit said valve control signal to the valve control means to actuate said valve control means to move said check valve to the open position.

2. A driving gear according to claim 1, wherein the adjusting means of each of the primary and secondary unit comprises:

adjusting piston means including first and second sides, and connected to the hydraulic engine of the unit to adjust the displacement thereof between maximum negative and maximum positive displacement values;
   means to conduct a control fluid to the first side of the adjusting piston means to urge said piston means to reduce the displacement of the hydraulic engine of the unit toward said maximum negative value; and
   a spring engaging the second side of the adjusting piston means and urging said piston means to increase the displacement of the hydraulic engine of the unit toward said maximum positive value.

3. A driving gear according to claim 1, wherein the adjusting means of each of the primary and secondary units comprises:
   adjusting piston means connected to the hydraulic engine of the unit to adjust the displacement of the engine, said piston means having (i) a maximum positive setting urging the hydraulic engine to increase the displacement thereof to a maximum positive displacement value, and (ii) a maximum negative setting urging the hydraulic engine to decrease the displacement thereof to a maximum negative displacement value;
   spring means engaging the piston means and urging said piston means to a centered position between said maximum positive and maximum negative settings; and
   means to conduct a control fluid to the piston to adjust the position thereof between said maximum positive and maximum negative settings.

4. A driving gear according to claim 2, wherein the pressure flow controller includes:
   a first pressure control valve in communication with the working line, the adjusting piston means of the primary unit and the reservoir, and having first and second sides, said control valve being moveable between (i) a first position for conducting the control fluid from the working line to the adjusting piston means and (ii) a second position for conducting the control fluid to the reservoir from the adjusting piston means;
   means to conduct the working fluid to the first side of the control valve; and
   an adjustable spring engaging the second side of the control valve.

5. A driving gear according to claim 2, wherein:
   the adjusting means of the secondary unit further includes a first control valve in communication with the working line, the adjusting piston means of the secondary unit and the reservoir, said first control valve being moveable between a first position for conducting the control fluid from the working line to the adjusting piston means of the secondary unit, and a second position for conducting the control fluid to the reservoir from the adjusting piston means; and
   the electronic control means transmits the control signal to said first control valve to move said valve between said first and second positions.

6. A driving gear according to claim 1, wherein:
   the valve control means includes a pilot valve having a first position to move the check valve from the open position to the closed position, and a second position to move the check valve from the closed position to the open position;
   the pilot valve is normally in the first position; and the electronic control means transmits said valve control signal to the pilot valve to move said pilot valve to the second position thereof, to move the check valve to the open position.

7. A hydrostatic driving gear comprising:
a primary unit adapted to be driven by a driving engine, and including
  i) a primary hydraulic engine having a continuously variable displacement, and
  ii) a first adjusting means to adjust the displacement of the primary hydraulic engine, through a zero displacement center position, to two directions of flow;
a secondary unit to drive an actuator, and including
  i) a secondary hydraulic engine having a rotatable shaft, and a continuously variable displacement, and
  ii) a second adjusting means to adjust the rotational speed of the shaft, and to adjust the displacement of the secondary hydraulic engine, through a zero displacement center position, to two directions of flow;
a hydraulic fluid circuit connected to the primary and secondary units, and including
  i) a fluid reservoir,
  ii) means to conduct fluid to the primary hydraulic engine from the reservoir,
  iii) a working pressure line to conduct fluid to the secondary hydraulic engine from the primary hydraulic engine,
  iv) means to conduct fluid to the reservoir from the secondary hydraulic engine, and
  v) a check valve disposed in the working pressure line, between the primary and secondary engines, and having an open position to conduct fluid through said working pressure line, and a closed position to prevent fluid from being conducted through the working pressure line from the primary engine to the secondary engine;
a pressure flow controller connected to the first adjusting means to maintain the pressure in the working pressure line at a selected value;
a position sensor connected to the second adjusting means to detect and to generate a first signal indicating the position of the second adjusting means;
a speed sensor connected to the shaft of the secondary hydraulic engine to detect and to generate a second signal indicating the rotational speed of the shaft; and
electronic control means connected to the position sensor and to the speed sensor to receive the first and second signals therefrom, and to generate a control signal and to transmit the control signal to the second adjusting means to adjust the speed of rotation of the shaft of the secondary hydraulic engine to a preselected speed;
wherein the adjusting means of each of the primary and secondary unit comprises
  i) adjusting piston means including first and second sides, and connected to the hydraulic engine of the unit to adjust the displacement thereof between maximum negative and maximum positive displacement values,
  ii) means to conduct a control fluid to the first side of the adjusting piston means to urge said piston means to reduce the displacement of the hydraulic engine of the unit toward said maximum negative value, and
  iii) a spring engaging the second side of the adjusting piston means and urging said piston means to increase the displacement of the hydraulic engine of the unit toward said maximum positive value;
wherein the pressure flow controller includes
  i) a first pressure control valve in communication with the working line, the adjusting piston means of the primary unit and the reservoir, and having first and second sides, said first pressure control valve being moveable between (i) a first position for conducting the control fluid from the working line to the adjusting piston means of the primary unit, and (ii) a second position for conducting the control fluid to the reservoir from the adjusting piston means of the primary unit,
  ii) means to conduct the working fluid to the first side of the first pressure control valve,
  iii) a first adjustable spring engaging the second side of the first pressure control valve,
  iv) a second pressure control valve in communication with the working pressure line, the adjustable piston means of the primary unit and the reservoir, having first and second sides, and located in parallel with the first pressure control valve, the second pressure control valve having a first position for conducting the control fluid from the working pressure line to the adjusting piston means of the primary unit and a second position for conducting the control fluid to the reservoir from the adjusting piston means of the primary unit,
  v) means to conduct the working fluid to the first side of the second pressure control valve from the working pressure line between the primary hydraulic engine and the check valve,
  vi) a second adjustable spring engaging the second side of the second pressure control valve, and
  vii) means to conduct the working fluid to the second side of the second pressure control valve from the working pressure line between the check valve and the secondary hydraulic engine.

8. A driving gear according to claim 7, further comprising:
a further secondary unit to drive a further actuator, and including
  i) a further hydraulic engine having a rotatable shaft, and a continuously variable displacement, and
  ii) a further adjusting means to adjust the rotational speed of the further shaft, and to adjust the displacement of the further hydraulic engine, through a zero displacement center position, to two directions of flow;
a further position sensor connected to the further adjusting means to detect and to generate a third signal indicating the position of the further adjusting means;
a further speed sensor connected to the further shaft to detect and to generate a fourth signal indicating the rotational speed of the further shaft;
a further electronic control means connected to the further position sensor and to the further speed sensor to receive the third and fourth signals therefrom, and to generate a further control signal and to transmit the further control signal to the further adjusting means to adjust the speed of rotation of the further shaft to a preselected value;

wherein the working pressure line is in communication with the further hydraulic engine to conduct fluid between the primary hydraulic engine and the further hydraulic engine; and the hydraulic fluids circuit further includes a further check valve disposed in the working pressure line, between the primary and the further hydraulic engines, and having an open position to conduct fluid through said working pressure line, and a closed position to prevent fluid from being conducted through the working pressure line from the primary engine to the further engine.

9. A driving gear according to claim 7, wherein the hydraulic circuit further includes a further actuator disposed in the working pressure line, between the primary hydraulic engine and the check valve.

10. A driving gear according to claim 9, wherein the further actuator comprises an adjusting cylinder having a cylinder space that can be fed by a sensor control valve.

* * * * *